United States Patent [19]
Taylor

[11] Patent Number: 6,016,192
[45] Date of Patent: Jan. 18, 2000

[54] EXTERNAL CALIBRATION SYSTEM FOR A PHOTO MULTIPLIER TUBE

[75] Inventor: Walter W. Taylor, Dale City, Va.

[73] Assignee: Dynex Technologies, Inc., Chantilly, Va.

[21] Appl. No.: 08/992,636

[22] Filed: Dec. 18, 1997

Related U.S. Application Data

[63] Continuation-in-part of application No. 08/561,636, Nov. 22, 1995.

[51] Int. Cl.[7] .................................. G01J 1/10; G01J 1/12
[52] U.S. Cl. ............................................. 356/229; 356/230
[58] Field of Search ..................................... 356/228, 229, 356/244, 246, 440, 435, 230; 250/361; 422/52, 82.05, 82.08, 82.09; 435/968, 808

[56] References Cited

U.S. PATENT DOCUMENTS 5,401,465   3/1995   Smethers et al. ..................... 422/52

*Primary Examiner*—Frank G. Font
*Assistant Examiner*—Michael P. Stefira
*Attorney, Agent, or Firm*—Donald C. Casey, Esq.

[57] ABSTRACT

An external calibration system for a photo multiplier tube is described. The calibration system uses a light emitting diode and a photo cell wherein the diode is domed shaped. The light sensitive face of the photo multiplier tube is contained in the plane disposed at an acute angle to the longitudinal axis of the light emitting diode, and the photo cell is mounted substantially perpendicular to the longitudinal axis. A source of electrical energy then illuminates the light emitting diode over a range from, for example, 0 to 5 volts to generate light of known intensity and the light being generated is simultaneously measured by the photo cell and the light sensitive face of the photo multiplier tube. A feedback circuit is provided and associated circuitry so that a number of readings can be taken over a wide variety of light intensities to generate a calibration for the photo multiplier tube.

6 Claims, 3 Drawing Sheets

EXTERNAL CALIBRATION SYSTEM FOR A PHOTO MULTIPLIER TUBE

CROSS-REFERENCE TO RELATED APPLICATION

This application is a continuation-in-part of U.S. application Ser. No. 08/561,636 filed Nov. 22, 1995, the disclosure of which is hereby incorporated by reference.

FIELD OF THE INVENTION

This invention relates to a calibration device for a photo multiplier tube (PMT) wherein the intensity of light generated is measured and evaluated against a standard in order to ensure that the intensity of light measured by the photo multiplier tube a fluorometer or luminometer is accurate.

DESCRIPTION OF THE PRIOR ART

Laboratory analysis of biological fluids often depends upon the measurement of the intensity of either a light beam passing through a cuvette or reflected from a cuvette, or the intensity of light generated by a chemical reaction within the cuvette. The reaction vessel typically is a small titration cuvette in a tray or strip such as MICROTITER manufactured by Dynex Technologies, Inc. assignee of this patent application.

If biological fluids, for example, are to be evaluate by fluorometric analysis, the fluids in a MICROTITER vessel are reacted and subsequently, a light beam is either passed through the vessel vertically, or into the vessel to be reflected back through the open top. The intensity is then read by a fluorometer which incorporates a photo multiplier tube.

In fluorometric analysis various system errors are inherent. For example, if the light beam passes through the vessel and through the bottom of the vessel, the bottom of the vessel itself may fluoresce and introduce a noise error. In addition, cross talk between adjacent wells can present a system error. While this is minimized by the use of pigmented vessels, it remains an error inherent in fluorometric analysis. A luminescent analysis eliminates certain of these errors and is thereby much more accurate. In luminescence, the biological fluid is reacted chemically or biologically in a titration cell to generate visible light. The light generated is directed upwardly, typically, through the open of the well where it is columnated and directed to a photo multiplier tube wherein the intensity is measured electrically. As in the case of fluorometric analysis, the intensity is proportional to a characteristic of the sample tested.

Test cells such as MICROTITER cells, are typically in plates containing eight rows of twelve cells and the tests conducted are automated. The PMT used to analyze the light signals, however, requires continual calibration because the PMT is relatively unstable. A light emitting diode (LED) on the other hand is a stable light source which typically can be used for calibration of the PMT. Calibration is important because in luminescent analysis, for example, the signal strength to be measured is often substantially weaker then that measured in fluorometric analysis. It is therefore necessary to ensure that the PMT is accurate over a wide range of signal strength from very weak to very strong.

A PMT calibration device then may use a LED to provide a signal of known strength, but the device must be capable of rapidly and continually calibrating the PMT over a wide range of signal strength.

In U.S. Pat. No. 5,401,465 there is described a luminometer with an internal calibration system. An external calibration system is also described wherein the calibration system is housed separately from the luminometer.

In the patented internal calibration system a light emitting diode is fitted in the wall of a housing opposite a photo diode and a chamber is defined within the housing. The intensity of the light emitted by the LED then is directly measured by the photo diode. The light from the LED, however, is scattered within the chamber and the chamber itself then provides a source of reflected light of constant intensity. The PMT is disposed in an upper opening in the housing and it reads the intensity of the reflected light in the cavity. The light from the LED is not directly read by the PMT.

In the patented external system described, separate light channels are provided emanating from a common source LED. An aperture is provided in each of the light channels at a predetermined distance from the LED and the size of the aperture then governs the intensity of the light emitted. The photo detection head or PMT reads the signal emitted through the aperture in each light channel. This device is in the form of a separate housing which may be transported among several photo multiplier heads or PMTs to calibrate them. The number of different intensities used for calibration, however, is limited by the number of light channels and apertures provided in the device.

Neither of the above calibration systems is designed for automated operation or rapidly calibrating a PMT over a wide range of light intensities. In the internal system described, while the LED intensity can be electronically varied, the reading is taken for reflected light only. In fact, a diffuser plate is present in order to insure that the light will be diffused before it reaches the PMT or photo detector head. In the external system described, the device is physically limited to a preset number of light channels and aperture sizes.

SUMMARY OF THE INVENTION

Accordingly, there is a need for an external calibrating system which can be transported from PMT to PMT to rapidly calibrate the same on a continuous basis over a wide range of light intensities.

According to the instant invention, a calibrating system has been discovered which is self contained and battery operated with a feedback circuit so that repeated calibrations over a wide range of intensities can be used. Furthermore, the device of this invention is structurally designed so that the LED will simultaneously direct light of known intensity on a photo multiplier tube and onto a photo cell so that the PMT reading can be directly compared with the reading from the photo cell. The feedback circuit then is provided so that the intensity of the LED can be controlled for any desired number of calibrating intensities.

Accordingly it is an object of this invention to provide a compact calibrating unit for a PMT which can directly evaluate the response over a wide variety of different intensities generated by a light emitting diode.

It is another object of this invention to provide an external calibration device which is self contained and which can be used for calibrating a luminometer without interfering with optical readings by the luminometer, but which can be used to directly generate a signal onto the PMT for calibration purposes only.

It is a further object of this invention to provide a PMT calibrating device which is self contained within a housing and which incorporates its own electronic feedback circuitry so that the desired light intensities from an LED can be directly read simultaneously by a photo cell and the PMT, the signals evaluated for calibration purposes, and quickly and efficiently process for calibration.

BRIEF DESCRIPTION OF THE DRAWINGS

These and other objects will become readily apparent with reference to the drawings and following description herein.

DETAILED DESCRIPTION OF THE INVENTION

Figure 1:
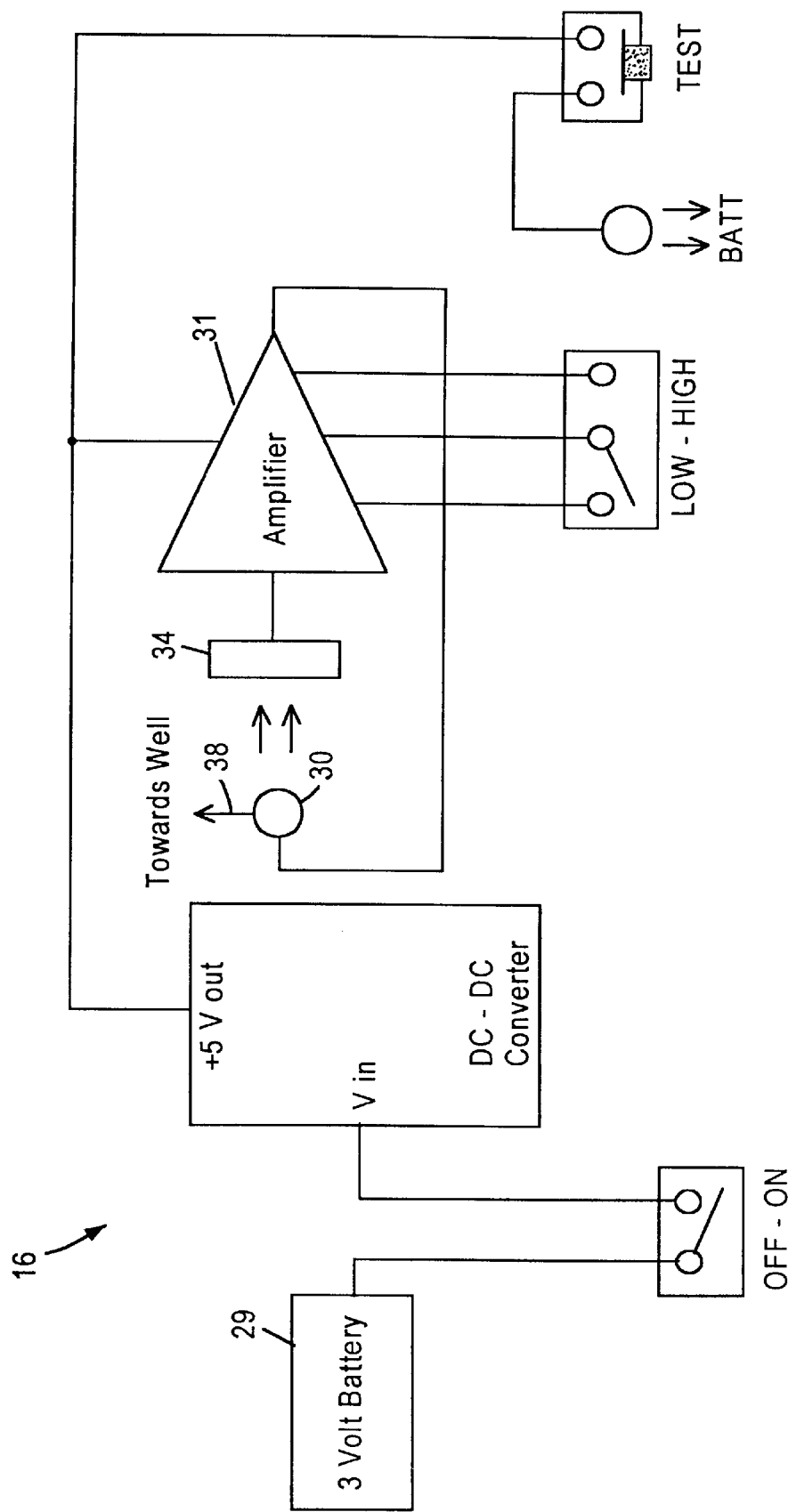
FIG. 1 is a schematic block diagram of the reference plate block of this invention.
Figure 2:
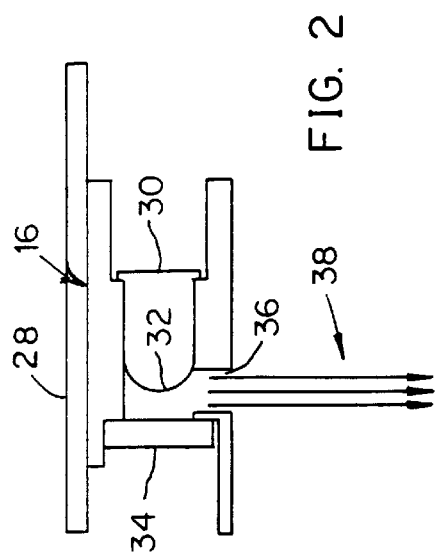
FIG. 2 is a schematic view of the reference block showing the LED and the photo cell for the calibrating device of this invention.
Figure 3:
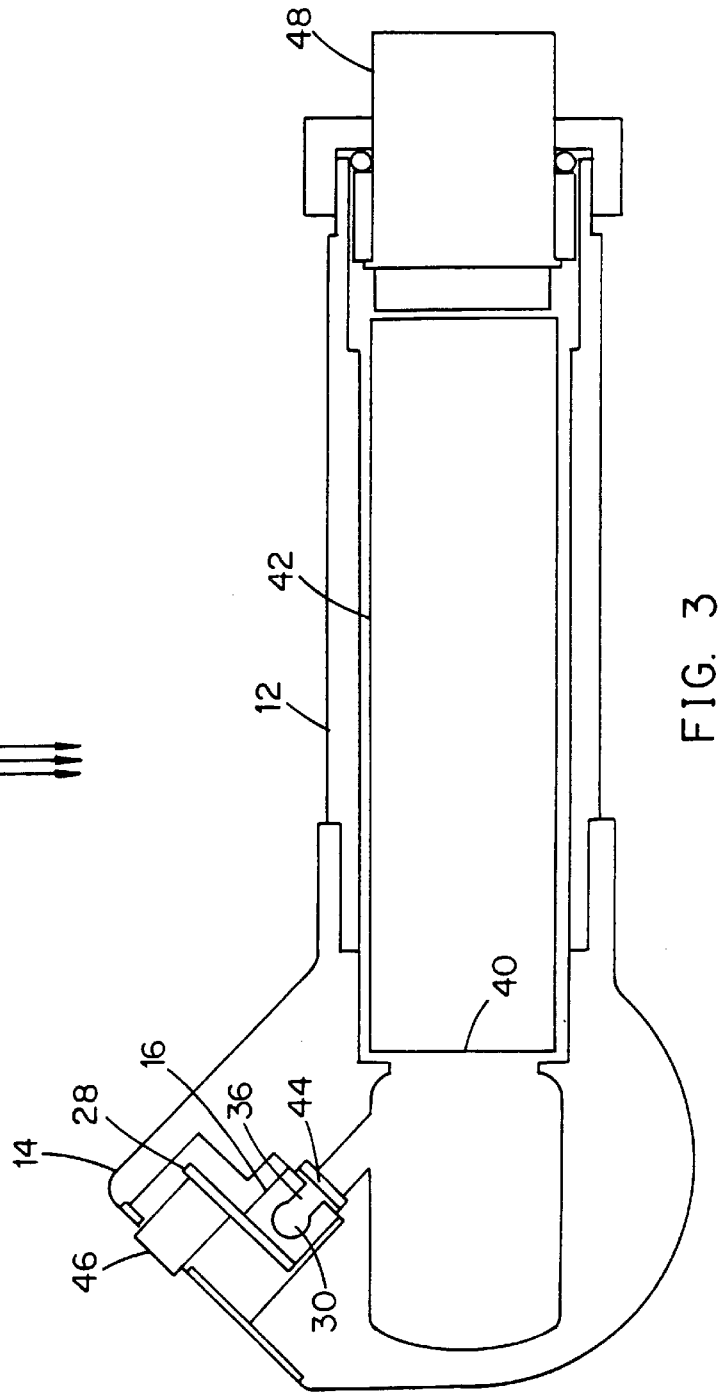
FIG. 3 is a schematic plan view of the optical system of the device of this invention illustrating the structural relationship between the calibration device of this invention and the face of the photo multiplier tube.

With attention to FIGS. 1–3, in the optical system for a luminometer, for example, light from a test well (not shown) impacts the face 40 of a photo multiplier tube 42 shown in FIG. 3.

In order to calibrate the photo multiplier tube 42, it is necessary to generate a light of known intensity which also impacts upon the face 40 so that the tube reading, as will be subsequently described, can be compared against a known standard. A reference block 16 is provided which mounts a circuit board 28 and an LED 30 which has a dome 32. The photo cell 34 is disposed directly, axially in front of the LED 30 and is typically 1 mm away from the dome 32. Light from the LED directly strikes the face of the photo cell 34. Because of the dome 32, however, light is also directed laterally through the aperture 36 in the direction 38 so that it impacts on the face 40 of the photo multiplier tube 42 as shown in FIG. 3. Typically a 3 volt battery 29 is provided to actuate the LED 30 and an amplifier 31 is provided. Voltage to the LED 30 then is controlled in the conventional fashion to generate a signal from the LED of known intensity.

The PMT 42, disposed within a housing 12, has a face 40 as noted above which is in alignment with the aperture 36 whereby light from the LED 30 passes through the aperture 36, a filter 44, and then directly strikes a face 40 of the PMT 42. The reference block 16 is then affixed to the PMT block 14 and an electrical socket 46 is coupled to the circuit board 28 which in turn controls the intensity of the light from LED 30 and the intensity reading from the photo cell 34. Similarly, a socket 48 is provided on the PMT 42 which is used to connect this photo detector to an associated electronic circuit (not shown).

Figure 4:
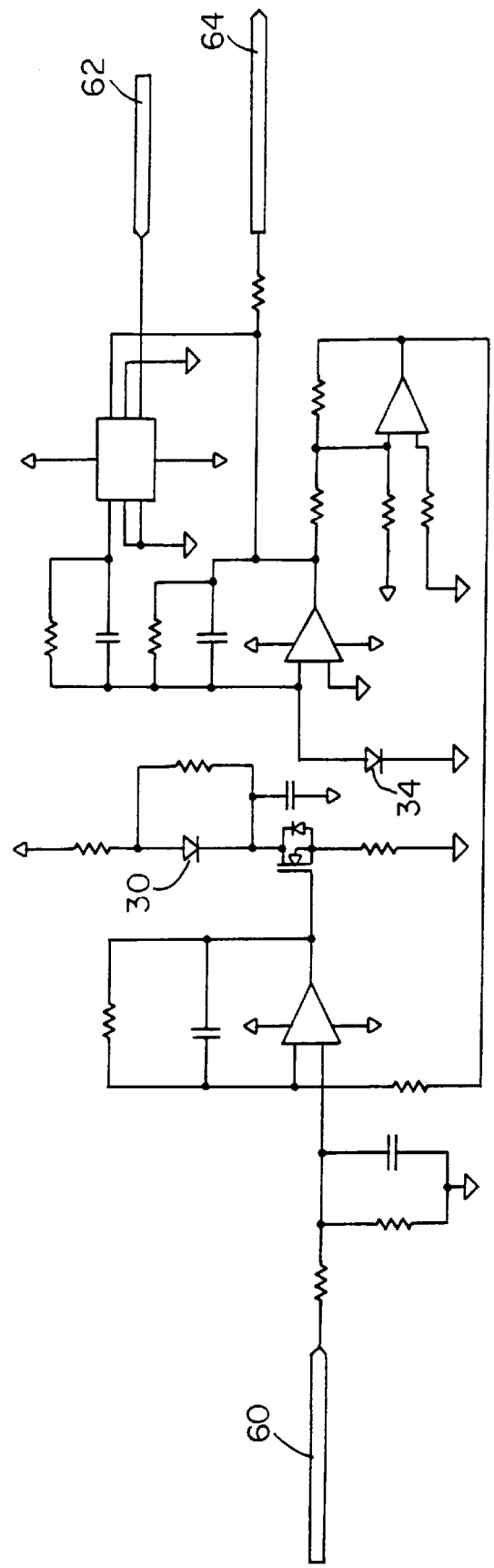
FIG. 4 is a circuit diagram of a typical feedback circuit for the calibration device of this invention.

With attention to FIG. 4 there is shown therein a circuit diagram intended to provide a stable and variable light reference over a wide range and a relative measurement of the light intensity. For example, typically the circuit herein will provide an LED reference over a range of 0.1 RLU to 10,000 RLU. The input 60 is from a micro-processor and, for example, could be from 0 to 5 volts (see FIG. 1). The dynamic range is altered by the gain input 62 which could be over a range from 1,000 to 1. The voltage output 64 measuring the light intensity of the LED is used to generate a calibration factor in associated software (not shown). The calibration factor generated then is used to modify the readings of the PMT 42.

As is known in the art, the photo cell 34 and diode 30 provide a stable light source. whereas the PMT 42 tends to waiver. It is necessary then to periodically calibrate the system to correct the PMT readings of light intensity from the test cell. The device of this invention then provides that calibration over a very wide range and recalculates the calibration factor periodically using internal software. A closed loop control of the PMT gain is then provided by comparison by the calibration LED selected intensity value.

The calibration factor referred to above is the gain factor times the photo cell reading provided by the PMT RLU value. The true RLU equals the raw PMT reading times the calibration factor. The gain factor referred to above is a value that is established upon factor calibration and is stored in non-volatile memory and not modified during normal operation. The gain factor specifically is a true well value divided by a PMT well reading times the PMT LED reading divided by the photo cell LED reading.

In summary then the device of this invention is intended to provide an external calibration for a PMT by providing a reference signal which can be varied in intensity over a wide range and uses a closed loop feedback to provide a calibration factor which is then used by software to modify the raw PMT reading. The device of this invention provides both a stable light source reference for calibration and a reference that is variable over a wide range of intensities. The structure of the calibration device uses a reference block or housing wherein the photo cell is disposed axially in close proximity to the LED whereas the light from the LED strikes the PMT without reflection. Because the LED is domed shaped, the light therefrom can simultaneously strike both the stable photo cell reference and the relatively unstable PMT whereby the photo cell intensity can be used to calibrate the PMT intensity reading against the known reference. The lights sensitive face of the PMT then is contained in a plane disposed at an acute angle to a longitudinal axis of the LED whereas the photo cell is disposed perpendicular to said axis.

It will be readily seen by one of ordinary skill in the art that the present invention fulfills all of the objects set forth above. After reading the foregoing specification, one of ordinary skill will be able to effect various changes, substitutions or equivalents and various other aspects of the invention as broadly disclosed herein. It is therefore intended that the protection granted hereon be limited only by the definition contained in the appended claims and equivalents thereof.

I claim:

1. An external calibration device for a photomultiplier tube having a light sensitive face comprising:

a reference block having a chamber therein; an elongated light emitting diode having a dome shaped end extending into said chamber; a photo cell mounted in the chamber adjacent said dome, substantially perpendicular to the longitudinal axis of said diode;

mounting means for coupling said block and said tube wherein the longitudinal axis of said diode is contained in a plane disposed at an acute angle to the light sensitive face whereby light from said diode simultaneously strikes said photo cell and the light sensitive face;

circuit means comprising a closed loop feedback circuit coupled between said diode and photo cell and adapted to be coupled to said photomultiplier tube for calibrating the light intensity reading of said tube with the light intensity reading of said photo cell responsive to light from said diode.

2. The device of claim 1 wherein said circuit means further comprises means for varying the intensity of light from said diode.

3. The device of claim 2 wherein said circuit means includes means for varying the intensity of light from said diode over a range of from 0.1 RLU to 10,000 RLU.

4. The device of claim 1 wherein said circuit means includes a battery coupled to said diode.

5. The device of claim 4 wherein said circuit means further comprises means coupled between said battery and diode for varying the voltage to said diode between about 0.1 and about 5 volts.

6. The device of claim 1 wherein said mounting means removably couples said block and said tube.

* * * * *